United States Patent Office 2,789,881
Patented Apr. 23, 1957

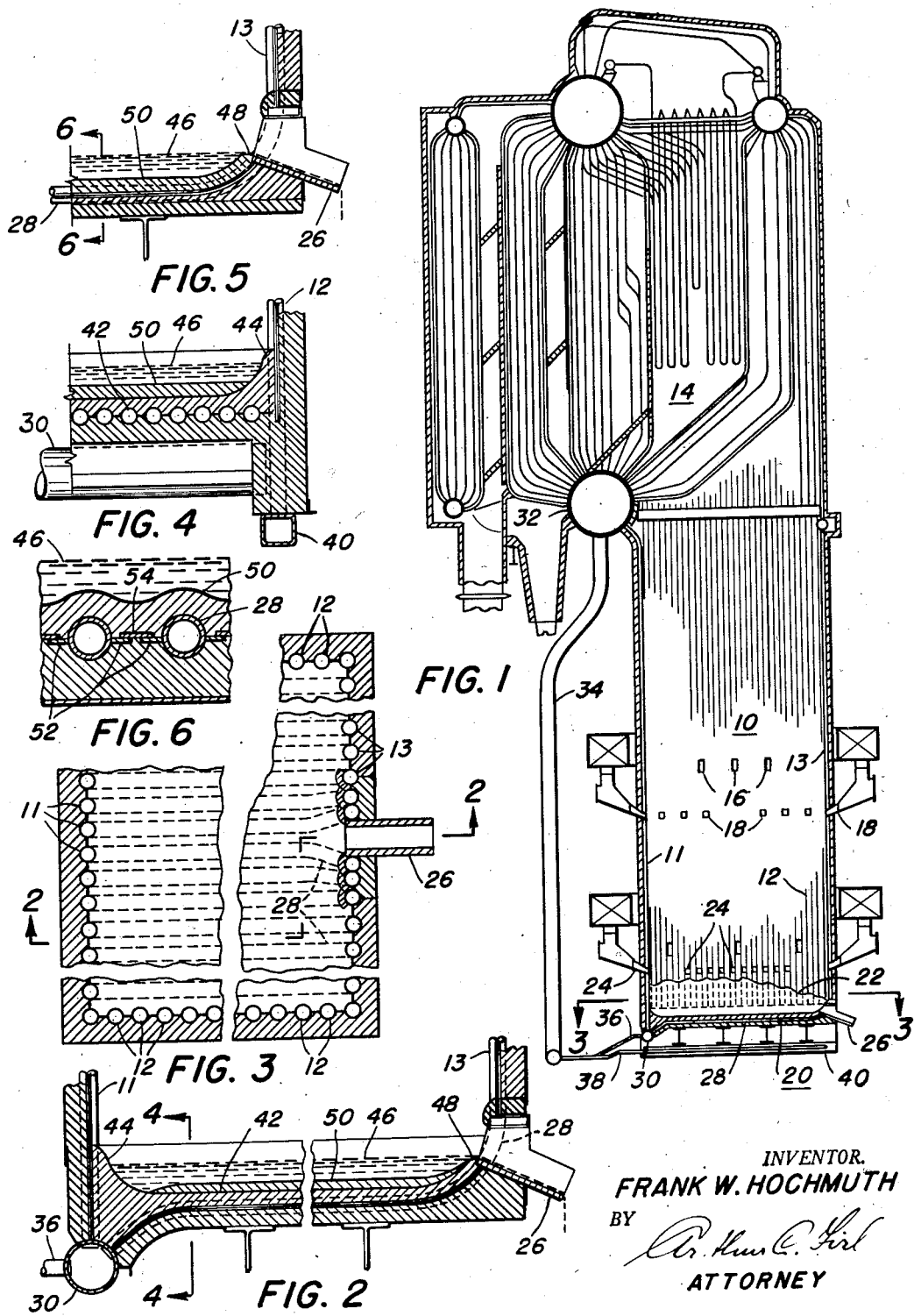

2,789,881

METHOD OF OPERATING A CHEMICAL RECOVERY SMELTER FURNACE

Frank W. Hochmuth, Scotch Plains, N. J., assignor to Combustion Engineering, Inc., New York, N. Y., a corporation of Delaware Application July 16, 1953, Serial No. 368,431

1 Claim. (Cl. 23—48)

This invention relates to improvements in the design of a smelter furnace hearth upon which is supported and from which a hot molten fluid is discharged. The invention is particularly concerned with the furnace smelter or melting pot of a chemical recovery furnace in which chemicals are recovered from the black liquor of wood pulp manufacture.

There are two known processes of chemical pulping, the soda process and the sulphate or kraft process. The latter process is here discussed by way of illustration, although my invention is useful in both of the aforementioned processes.

In wood pulp manufacturing the chemical solution procured during one state of the process is called black liquor and is obtained from the wood by the action of caustic soda or a mixture of caustic soda and sodium sulphide upon the wood in a heated digester. In both the soda and the sulphate process sodium hydroxide is used to distill the lignin binder in the wood. After the action of the chemicals on the wood has been completed the material is washed. The wash liquor, or black liquor, contains substances such as relatively expensive sodium compounds which should be recovered from the standpoint of economical operation.

In the sulphate process, one step of accomplishing retrieval of chemicals consists in mixing the liquor with so-called "salt cake," acting as the make up of sodium sulphate, and spraying the black liquor at a proper consistency into the feeding and drying zones of the chemical recovery furnace for combustion of carbonaceous matter. There while in suspension most of the water in the liquor is driven off by the heat in the furnace and charred particles are formed containing little moisture. This char or black ash, as it is frequently called, constitutes the dry solids in the black liquor and falls down to the bottom or hearth of the furnace forming a pile several feet thick. The carbonaceous matter in the dry solids is then burned out in the combustion zone directly above the hearth or thereon and the heat thus generated is used for maintaining the chemical reactions taking place in the furnace and also for steam production in the associated waste heat boiler. The chemical inorganic ash remaining after burning of the combustible is fused by the heat of combustion. As this chemical ash is melted, the sodium sulphate, in the presence of carbon and a reducing atmosphere, is reduced to sodium sulphide. The sulphide is then removed from the furnace by spouting the molten smelt to a dissolving tank by way of one or more smelt spouts located at the furnace bottom, and extending through the walls of the furnace.

The primary object of my invention is the provision of an improved furnace bottom for burning of the black ash and for carrying on the chemical reaction in a more efficient manner.

Another object of prime importance is the provision of a furnace bottom which will enable drainage from the smelter furnace of the hot smelt without destruction of the furnace bottom through corrosive and erosive action of the hot chemical smelt flowing thereover.

Additional objects of the invention will appear from the following description of one preferred embodiment of the invention when taken in conjunction with the accompanying drawings wherein:

Fig. 1 is a section elevational view of a waste heat boiler with chemical recovery furnace to which my furnace bottom is applicable.

Fig. 2 is an enlarged elevational section through the lower portion of the smelter furnace showing the construction of the furnace bottom in greater detail.

Fig. 3 is a fractional cross section taken on line 3—3 of Fig. 1.

Fig. 4 is another elevational partial section of the furnace bottom taken on line 4—4 of Fig. 2.

Fig. 5 is an elevational partial section through a furnace bottom having bare tubes exposed to the smelt.

Fig. 6 is an enlarged cross section of the finned floor tubes as taken on line 6—6 of Fig. 5.

Referring first to Fig. 1 the reference character 10 denotes one conventional form of smelter furnace, the four walls of which are lined with heat exposed and closely spaced tubes 11, 12 and 13 connected to a waste heat boiler proper 14 for circulation of water and generation of steam.

Appurtenances of the unit such as liquor evaporators, air heaters, fans and the like are not here shown.

The black liquor at the desired concentration of solids is introduced into the furnace chamber 10 in a fluid state by way of nozzles 16. Supported by preheated air entering through nozzles 18 combustion of the lighter volatiles in the black liquor takes place at this stage. The small amount of water contained in the black liquor is at this time almost completely evaporated by the heat liberated and by the hot gases rising in the smelter furnace. The solid content of the black liquor, the so-called black ash, falls to hearth 20 in a nearly dried state where it burns in a bed 22. To maintain a reducing atmosphere preheated air is admitted into this bed as by means of inlets 24 in amounts sufficient to continue combustion within the bed 22.

Evaporation of the small percentage of moisture contained in the black ash occurs and final distillation of volatiles and burning of the solid carbonaceous material takes place. At the same time sodium sulphate is converted into sodium sulphide in the presence of carbon and a reducing atmosphere. This sodium sulphide is one component of a hot molten mixture called "smelt" which slowly collects at the bottom of the furnace below bed 22 and essentially consists of sodium carbonate and sodium sulphide. The smelt is continuously withdrawn from the furnace by way of smelt spout 26 into a dissolving tank (not shown) for further processing.

Earlier designs of smelter furnace bottoms have been troublesome because of the corrosion and erosion they suffer from the molten smelt which flows over the hearth as it drains from the furnace. In most previous designs the hearth was formed out of refractory materials which were installed to produce a definite slope on the hearth towards the smelt spout so that effective drainage proceeded out through the smelt spout. In some cases these refractory hearth bottoms were about 12″ thick and were independently supported by floor tubes. It was found that the life span of a hearth constructed in this manner would normally be only about 18 months. After that time the refractories are so washed away by chemical as well as physical action of the smelt draining there across that the bottom either develops leaks or else becomes dangerously thin so that it must be replaced at considerable cost.

Later designs, in an attempt to overcome this erosion corrosion problem, consisted of water cooled floor tubes covered with a relatively thin (about 3") layer of plastic chrome ore. The purpose of this later design was to keep the refractory material cool enough so that it would better withstand the corrosive as well as erosive action of the smelt as the latter drained from the furnace. Again in this design the hearth bottom was installed at a definite slope towards the smelt spout. Experience however indicated that the advantages of this design were not realized to the extent expected because the smelt flowing across the hearth still attacked the chrome ore, washed it away and later exposed the floor tubes to the liquid smelt. It was found that with the floor tubes thus exposed to the hot chemicals the smelt began to attack the metal of the tubes until rupture of the tubes occurred which necessitated the shutting down of the unit for costly repairs.

The action of the molten smelt becomes more pronounced as the velocity thereof is increased while flowing across the floor toward the spout. This is due to the accelerated heat absorption rates and higher tube metal temperatures resulting from an increased and more turbulent flow of hot liquid smelt. One will note that the quantity of smelt flowing is at a minimum adjacent the wall opposite the smelt spout and increases as the smelt spout is approached. Immediately before entering the smelt spout the entire drainage from the furnace is passing over a relatively small area of the hearth bottom. Experience has taught that the portion of the hearth at the entrance of the smelt spout receives the most severe service. A secondary effect of smelt flowing at high velocities across water cooled tubes is that the high rate of heat absorption promotes a more rapid formation of scale on the inside of the tubes if scale forming substances are present in the boiler water. This aggravates the tendency for tube metal to wash away since the scale prevents efficient heat transfer through the tube wall causing the temperature of the exposed tube surface to increase above normal values.

In my improved design which will now be described in detail I have succeeded in greatly diminishing the objectionable features set forth above. My invention provides for a water cooled hearth structure requiring little or no maintenance by minimizing the possibility of metal wastage and by avoiding dangerously high heat absorption rates in the floor tubes. This I have accomplished primarily through the establishment of a definite and peculiar relationship between the elevational location of the smelt spout 26 and that of the hearth floor 20.

In Fig. 2 there is shown an enlarged cross section through a preferred design of my improved hearth bottom. Tubes 28 forming the supporting structure are a continuation of furnace front wall tubes 13 (see Fig. 1) and terminate in lower rear wall header 30. This header receives a supply of water from lower boiler drum 32 by way of down take pipe 34 and connecting tubes 36. A portion of the water supplied in this manner to header 32 flows upwardly through rear wall tubes 11 and the remaining portion flows through bottom tubes 28 and continues on upwardly through front wall tubes 13. Side wall tubes 12 are similarly supplied with water through downtake pipe 34 by way of tubes 38 and lower side wall header 40.

In the preferred embodiment illustrated in Fig. 2 a layer of chrome ore 42 covers the bottom supporting and cooling tubes 28. This chrome ore covering preferably extends upwardly along the inner sides of the front, rear and side walls of the furnace to form a pan like container 44 wherein a pool of molten smelt 46 can be retained. The depth of the pool depends on the elevation of the lower edge 48 of the smelt spout 26 above the bottom of the pan 44. During operation the excess of the smelt will overflow over edge 48 and will be discharged by way of spout 26 in a continuous flow.

Water circulating through tubes 28 will carry away some of the heat contained in the body of smelt 46 being retained in pan 44. The heat thus absorbed by the cooling water is replaced by heat supplied through the combustion process taking place inside the furnace 10. This heat accordingly must flow through the body of smelt 46 to cooling tubes 28. That portion of the body of smelt 46 which is nearest the tubes 28 will solidify as soon as the temperature thereof falls below the fusion point of the smelt. A body of solid smelt 50 therefore is formed between the tubular water cooled supporting structure 28 and the liquid smelt 46.

Figs. 3 and 4 illustrate how these tubes 28 are spaced to support and cool the bottom of the hearth. The enlarged section Fig. 6 shows how longitudinal fins 52 which are welded to tubes 28 are employed to close the gap between the tubes and to present additional heat absorbing or cooling surfaces. The space between adjacent fins is covered by metal strips 54 or may be sealed by other means such as welding.

In Figs. 5 and 6 is illustrated a smelter furnace bottom wherein the chrome ore layer is eliminated. A layer of solid smelt 50 is relied upon exclusively to protect the tubes 28 from the destructive action of the smelt.

Thus the advantages resulting from my improved furnace bottom design are realized by setting up a condition wherein a layer of frozen or solidified smelt 50 will be formed and will always remain in contact with the chrome ore 42 covering the hearth 20 (see Fig. 2) or the floor tubes 28 (see Fig. 5). I have observed that when smelt such as is obtained from the kraft or sulfate recovery process is maintained in a state below its fusion temperature it does not adversely react with the chrome ore refractory 42 or any of the materials normally used in the manufacture of boiler and furnace tubes. Any chemical reaction that might occur between the smelt and the refractory or between the smelt and the tube metal prior to solidification of the smelt would undoubtedly become stabilized due to the protective film formed by the corrosion products. This protective film of course would not be disturbed as long as the adjacent smelt layer 50 is maintained in a static condition such as in a solid state.

Since smelt in both solid and liquid phases exhibit a certain resistance to heat flow, a solid layer 50 can be maintained after sufficient heat is extracted from the layer at a rate which will keep it cooled below the fusion temperature. The thickness of this solid layer 50 accordingly can be controlled by adjusting the height of the liquid smelt layer 46 above the floor elevation thereby increasing or decreasing the total resistances to heat flow from the molten smelt 46 to the cooling tubes 28 in the furnace bottom.

The height of the smelt layer 46 is of course determined by the elevation of the smelt spout 26 with respect to the furnace bottom. I have found that the inlet edge 48 of the smelt spout 26 should be located between 5½" and 9½" above the center line of the floor tubes 28 for best overall performance. With a 3" diameter tube the top surface of the floor tube 28 would accordingly be between 4" and 8" below the surface of the smelt pool; the exact distance of course depending in each case on prevailing design conditions such as fusion temperature of the smelt and rate of heat absorption of the cooling tubes.

It was found that the temperature of the smelt leaving the furnace maintains itself very close to 1650–1700° F. This temperature persists even though the temperature of the furnace atmosphere may change. From these observations it can accordingly be assumed that the temperature of the smelt would rarely exceed 1700 and would hardly be ever less than 1500° F.

In a furnace bottom as shown in Fig. 2 and designed in accordance with the above, i. e. wherein the inlet edge 48 of the smelt spout 26 is located between 4" and 8" above the top of the tubes it was found that a layer of non liquid smelt is maintained at a distance of between 2" to 4" from the face of the tube depending upon the prevailing furnace temperature and location in the furnace bottom.

The thickness of the solid layer 50 in the embodiment of Fig. 5, wherein the chrome ore layer is eliminated, also of course depends on hte depth of the liquid smelt layer 46 above the upper face of cooling tubes 28, which depth in turn is again determined by the location of the run-off edge 48 of spont with relation to the hearth bottom. I have found in a design such as represented by Figs. 5 and 6 that by locating the above mentioned run-off edge approximately 4 inches above the face of the cooling tube, a satisfactory protective layer of solid smelt 50 will be obtained under normal operating conditions.

Experience has indicated that a shallow smelt pool is desirable since it does reduce expansion stresses being set up when the recovery unit is made to undergo many start-ups and shut-downs, which result in repeated solidification and remelting of the retained smelt.

While the invention has been described in a smelter furnace having a bottom supporting and cooling structure comprising rows of finned tubes 28, closely spaced tubes without fins or tubes with other surface extensions such as studs could be used to practice my invention. Furthermore certain advantages of the invention could be realized by resorting to other fluid cooled bottom supporting means such as duct like passages through which a cooling fluid such as air is made to circulate.

I claim:

The method of retaining and discharging products of combustion, forming a hot liquid smelt of sodium carbonate and sodium sulphide, from the bottom of a chemical recovery smelter furnace wherein there is the danger of a destructive chemical action taking place between the hot liquid smelt and the furnace bottom structure, the steps which comprise: discharging into said furnace and burning therein a continuous stream of black liquor thereby causing the forming of a body of hot liquid smelt in the bottom of the furnace, said smelt being composed mainly of sodium carbonate and sodium sulphide; producing a thin layer of produces of corrosion by chemical action of the smelt upon the surface of said furnace bottom structure; continuously cooling said furnace bottom structure to a temperature below the melting point of said smelt, thereby causing solidification of a first body of smelt in direct contact with said layer of corrosion products by virtue of the cooling action of said supporting structure; maintaining said products of corrosion in a static condition forming an insulating layer, thereby preventing further corrosive action upon the surface of said bottom structure; retaining a sufficiently thick second body of hot liquid smelt above said first body of smelt to insulate the first body from the melting action of the furnace heat; and discharging continuously the surplus of said products of combustion from said furnace through an opening in the side thereof, whereby the cooling action upon the said supporting structure carries away sufficient heat from the total heat in the first and second bodies of smelt to maintain the solid first body of smelt adjacent said supporting structure covered with protective inactive corrosion products at a temperature below the melting point of the smelt.

References Cited in the file of this patent

UNITED STATES PATENTS

| | | |
|---|---|---|
| 1,774,333 | Laist | Aug. 26, 1930 |
| 1,900,320 | Wagner | Mar. 7, 1933 |
| 2,023,031 | Rohrer | Dec. 3, 1935 |
| 2,050,400 | Wagner | Aug. 11, 1936 |
| 2,238,007 | Badenhausen | Apr. 8, 1941 |
| 2,594,267 | Wilcoxson | Apr. 22, 1952 |
| 2,673,083 | MacPherson et al. | Mar. 23, 1954 |